Aug. 16, 1949.  E. R. GOLDFIELD  2,479,344
MOTOR BRAKING DEVICE
Filed Oct. 26, 1944

INVENTOR.
EDWIN RUSSELL GOLDFIELD
BY
Hyde and Meyer
ATTORNEYS.

UNITED STATES PATENT OFFICE 2,479,344

MOTOR BRAKING DEVICE

Edwin Russell Goldfield, University Heights, Ohio, assignor to Picker X-Ray Corporation Waite Manufacturing Division, Inc., Cleveland, Ohio, a corporation of Ohio Application October 26, 1944, Serial No. 560,481

4 Claims. (Cl. 172—36)

This invention relates to improved braking means for electric motors.

An object of the present invention is to provide a brake for the rotor of an electric motor which is continuously urged toward braking position and which is released by means of a magnetic armature which is attracted to an electromagnetic pole piece of the motor whenever the same is magnetized.

A particular application of my invention occurs in connection with a shaded pole induction motor where the magnetic armature for releasing the brake is positioned adjacent the shading coil.

A further modification of my invention occurs in the provision of a shading ring on the magnetic armature which is attracted to the electromagnetic pole piece for the purpose of releasing the brake.

Other objects and advantages of the present invention and the details adopted in practicing my invention will be apparent from the accompanying drawings and description, and the essential features will be set forth in the accompanying claims.

In the drawings,

Fig. 4 is a side elevational view of the device of Fig. 1; while

Fig. 5 is a fragmental perspective view showing one end of the magnetic armature of Fig. 1.

Figure 1:
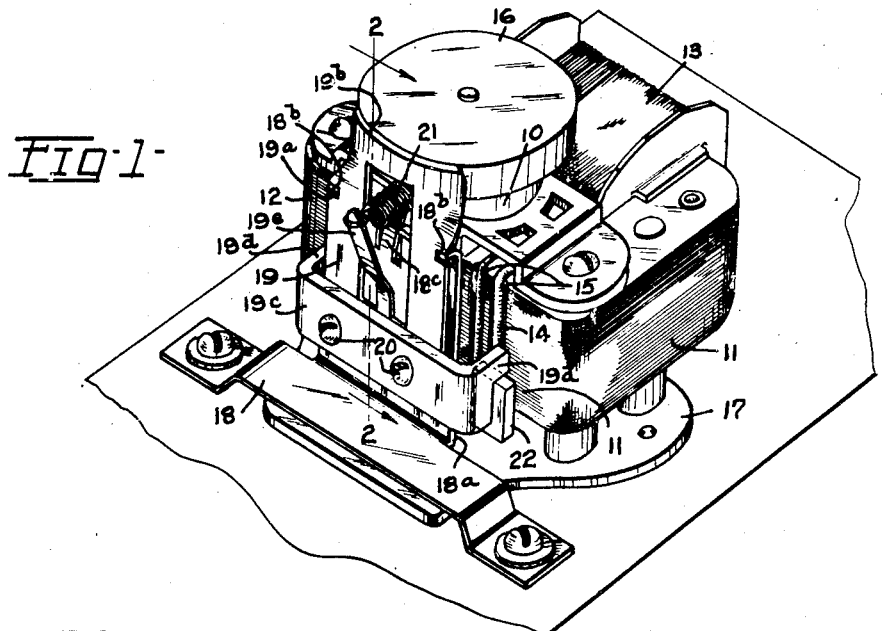
Fig. 1 is a perspective view of a small motor equipped with my improved device.
Figures 2, 3:
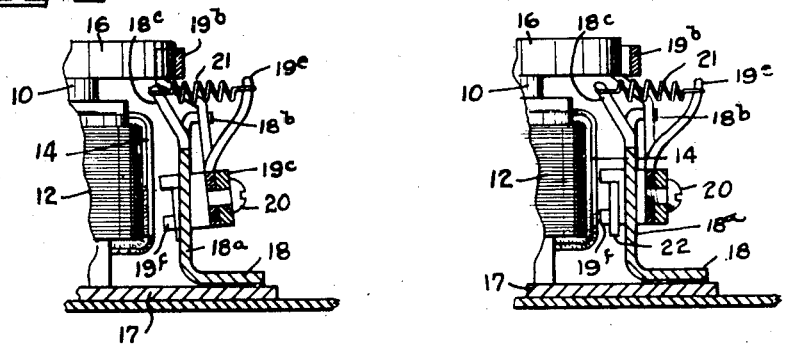
Fig. 2 is a fragmental sectional view taken along the line 2—2 of Fig. 1.
Fig. 3 is a view similar to Fig. 2 but showing the brake in released position.

The purpose of the present invention is too quickly stop the rotor of an electric motor when the energizing electric current is turned off. Unless such means is provided, the inertia of the rotor and the driven parts connected therewith is such that it will not come to rest quickly enough when the current is turned off and it is essential in most applications that the speed of stopping be accurately controlled. Braking devices are well known in which a brake shoe bears against some part connected with the rotor at all times when the motor is not energized. Then this brake is released usually by means of a solenoid which is energized simultaneously with the motor. My present improvement accomplishes the same purpose but without the use of a separate solenoid.

The drawings show my invention as applied to a shaded pole induction motor of small size and adapted to revolve at about 3,300 R. P. M. The motor illustrated comprises a rotor 10 mounted in suitable bearings for rotation between pole pieces 11 and 12 which in the present embodiment are shown of laminated construction. These poles are magnetized in the usual manner by means of the fixed winding 13 which is energized by means not shown in the usual manner when current is supplied to the motor. The motor shown is provided with shading coils 14 which rest in suitable recesses or grooves 15 in the pole pieces. On the upper end of the rotor shaft is fixed a brake drum 16 which rotates with the rotor. The entire motor is mounted on a base 17.

The braking means is mounted on a bracket 18 in fixed relation to the base 17 and having an upstanding flange portion 18a, at the upper end of which two ears 18b are provided extending outwardly at right angles to the flange portion. Located centrally of the upper edge of the flange portion is a tongue 18c for supporting a spring as later described.

A lever 19 is provided with notches 19a intermediate its ends into which the ears 18b extend to provide a fulcrum for the lever. The upper end of the lever is provided with a brake shoe 19b adjacent the brake drum 16. The lower end of the lever is provided with a magnetic armature 19c secured to the lever by the screws 20. The ends of this armature are bent inwardly as at 19d to points adjacent the pole pieces 11 and 12. A tongue 19e extends upwardly and outwardly from the bottom of the lever to a point opposite the tongue 18c. A small coil spring 21 is held in tension between the tongues 18c and 19e. This spring is positioned above the fulcrum of the lever and therefore serves to continuously pull the shoe 19b against the drum 16.

It results from the above construction that when current is supplied to the winding 13 upon starting the motor, the pole pieces 11 and 12 are magnetized which in turn will attract the armature 19c and release the brake shoe 19b from the drum 16. This action takes place because of the high stray or leakage flux which exists around the pole pieces of the motor. This is particularly true in the locality of the shading coils 14 where the flux is greater. I, therefore, prefer to position the ends 19d of the magnetic armature adjacent these shading coils as shown.

Figures 4, 5:
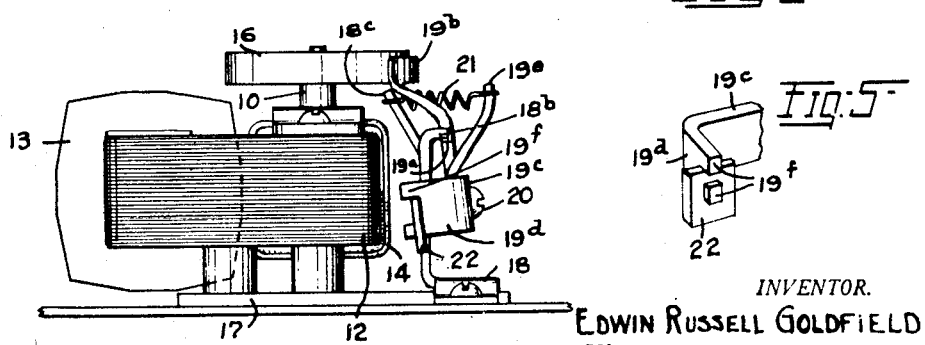

For substantially reducing or eliminating chatter between the armature 19c and the pole pieces, I may provide a shading ring 22 on the armature and at right angles to the plane of the shading coils 14. As best seen in Figs. 1 and 5, the ends 19d of the armature 19c are bifurcated, and the shading ring 22 of copper or other suitable metal is fixed to one of these bifurcated ends 19f. The shading rings 22 are positioned generally parallel to a plane passing through the rotor and pole pieces. In this manner, an out-of-phase flux is provided which substantially reduces chatter of the armature during energization of the motor.

In the above manner I have provided a very efficient means for braking the rotor immediately upon the deenergization of the motor including the coil 13 and have also provided very simple means for releasing the brake immediately upon the energization of the coil 13 which is a standard part of the motor shown and does not require any extra electrical devices.

What I claim is:

1. Braking means for an electric motor having a rotor and electromagnetic pole pieces supporting the field windings of said motor and said motor having a shading coil on at least one of said pole pieces, comprising a brake drum rotatable with said rotor, a brake shoe adjacent said drum, means urging said brake against said drum, and means for moving said shoe away from said drum including a magnetic armature positioned to receive the magnetic flux diverted by said shading coil.

2. Braking means for an electric motor having a rotor and electromagnetic pole pieces supporting the field windings of said motor and said motor having a shading coil on at least one of said pole pieces, comprising a brake drum rotatable with said rotor and positioned laterally upon said pole pieces, a lever having a fulcrum intermediate its ends, a brake shoe at one end of said lever positioned adjacent said brake drum, a magnetic armature at the other end of said lever and positioned to receive the magnetic flux of said shading coil, and spring means urging said shoe against said drum, said armature being adapted when attracted by said pole piece to move said shoe away from said drum.

3. Braking means for an electric motor having a rotor and electromagnetic pole pieces and having a shading coil on at least one of said pole pieces, comprising a brake drum rotatable with said rotor and positioned laterally upon said pole pieces, a lever having a fulcrum intermediate its ends, a brake shoe at one end of said lever positioned adjacent said brake drum, a magnetic armature at the other end of said lever, a shading ring on said armature and adjacent said shading coil, said shading ring lying in a plane generally at right angles to the plane of said shading coil, and spring means urging said shoe against said drum, said armature being adapted when attracted by said pole piece and shading coil to move said shoe away from said drum, and said shading ring being adapted to reduce chatter.

4. Braking means for an electric motor having a rotor and electromagnetic pole pieces comprising a brake drum rotatable with said rotor, a brake shoe adjacent said drum, means urging said brake against said drum, means for moving said shoe away from said drum including a magnetic armature positioned adjacent at least one of said pole pieces, and a shading ring on said armature opposite said one pole piece and extending generally in a plane parallel to a plane passing through said rotor and pole pieces, whereby to substantially reduce chatter of said armature.

EDWIN RUSSELL GOLDFIELD.

REFERENCES CITED

The following references are of record in the file of this patent:

UNITED STATES PATENTS

| Number | Name | Date |
|---|---|---|
| 363,186 | Thomson | May 17, 1887 |
| 728,974 | Pott et al. | May 26, 1903 |
| 1,005,857 | Lindquist | Oct. 17, 1911 |
| 1,437,421 | Holliday | Dec. 5, 1922 |
| 1,518,020 | Traver | Dec. 2, 1924 |
| 1,689,442 | Lexa | Oct. 30, 1928 |
| 1,768,950 | Frank | July 1, 1930 |
| 1,822,679 | Stewart et al. | Sept. 8, 1931 |